Patented Dec. 29, 1936

2,065,937

UNITED STATES PATENT OFFICE 2,065,937

RUBBER COMPOUND AND METHOD OF MAKING THE SAME

Glen S. Hiers, Cynwyd, Pa., assignor to Collins & Aikman Corporation, Philadelphia, Pa., a corporation of Delaware No Drawing. Application April 20, 1933, Serial No. 667,043

4 Claims. (Cl. 18—50)

My invention relates to aqueous sols having a dispersed rubber phase solidifiable into coatings or objects which are thereafter insoluble in water and are reconverted into sols only with difficulty, and a leading object of my invention is to regulate the relationship between the viscosity of the sol and the concentration of the colloid therein. By my improvements there may be produced latex compounds having high viscosities without concentration above normal of the rubber colloids, without substantial modification of the colloidal condition of the rubber hydrocarbon, and without loading the compounds with large amounts of inert fillers. By my improvements, I am enabled to avoid the losses of valuable products entailed in "creaming" or the separation of serum from rubber globules heretofore resorted to in order to increase the viscosity of latex.

I have found that by the addition to such sols of minute quantities of solutions of certain vegetable gums, (generally identifiable as polysaccharids which in solution are caused to gel by the addition of borax) the viscosity of the sol may be increased above normal and the concentration of the rubber colloids in the sol may be decreased much below that of natural latex without substantially impairing the strength, tenacity, ageing and holding power of a solidified film or mass of the material. These results may be accomplished while retaining substantially the same total solids content in the latex or latex composition as is present in much less viscous compositions having substantially similar concentrations of rubber colloids, and my improvements consequently avoid the deleterious effects inherent in the addition of considerable amounts of inorganic fillers or of materials which in themselves, or in combination with latex, will gel.

My invention is particularly applicable to the treatment of latices of rubber and related gums, and compounds thereof, for application to the back of pile fabrics to secure the pile tufts in a loosely woven backing, as set forth in my copending application Serial No. 532,993, whereof this application is a continuation in part. In the production of such fabrics it is essential that the coating sol have sufficient viscosity to avoid penetration thereof through the loosely woven backing to the face of the fabric and it is also desirable that the coating sol have such low concentration of solidifiable solids as to form a thin flexible film,—free of bubbles or substantial quantities of loading material, and inseparable from the fabric because of the penetration of the substantially unmodified colloidal particles into the pores of and interstices between the fibres.

Rubber latex in its natural state normally contains from 30% to 35% of rubber colloidally dispersed in water and a similar product may be made by the dispersion of coagulated rubber in water. All such rubber dispersions, whether natural or artificial, are referred to herein as "latex". The viscosity of such latex is but little greater than water and at normal temperatures tends to penetrate through textile fabrics. If applied in practicable quantities, it not only tends to penetrate to the face of the fabric, but forms a coating of greater rubber content, body and thickness that is necessary or desirable for many uses. The concentration of the rubber colloids up to 50% or more, or the addition of anti-oxidants, accelerators, vulcanizers or fillers, has little effect upon the viscosity of the material unless used in such large quantities as to decrease materially the adhesion, anchoring power and ageing of the coating and to result in a still heavier and less flexible coating than the latex alone. Entrapping air in the latex results in an unstable viscosity and produces a porous film when solidified.

In accordance with my invention, the aqueous phase of the sol is preferably diluted so as to decrease the concentration of rubber colloids per volume of sol and the aqueous phase is rendered abnormally viscous without affecting the colloidal condition of the rubber or introducing such volume of loading material as tends to dissipate the cohesive force of the rubber in cementing such particles together. The product is used without creaming or separation or concentration of the rubber colloids.

The viscosifying materials suitable for the practice of my invention are such as are compatible with and do not tend to coagulate rubber. They should form, with water, solutions or sols having, in 0.5% aqueous concentration at 23° C., a viscosity of not less than 40 seconds as measured on a Saybolt viscosimeter within one hour after dispersion in water and which dry to a non-tacky, friable, non-oleaginous film. The quantity of the viscosifying material used should not exceed 10% of the dry weight of the rubber colloids in the coating composition and for textile coatings, I preferably select substances having sufficiently high viscosities in solution to require the use of less than two parts dry weight of viscosifier to one hundred parts dry weight of rubber even when the rubber colloids constitute but 20% by weight of the sol.

Due to the lower percentage of rubber solids present per volume of fluid coating, the film when dried on the fabric is much thinner and more flexible than films resulting from the application of equal volumes of latex compounds having normal rubber colloids concentrations. The use of minute quantities of viscosifying agent in accordance with my invention does not cause porosity of the film such as results from the use of gels and their subsequent removal by washing, (viz., starches, glues, casein, gelatin, agar or flaxseed extract), or of thickeners (viz., dextrine, gum arabic, althea, mesquite gum, india gum, slippery elm or other demulcents) all of which must be used in undesirable quantities to have any substantial viscosifying effect. The dissipation of the cohesive power of the rubber colloids such as results from the use of inert fillers is also avoided by my improvements.

The vegetable gum polysaccharids used in my invention are dispersible in water, and are hydrolyzed into soluble saccharids in acidulated water, hence any free polysaccharid may be washed out in an acid dye bath concurrently with the dyeing of the pile of the fabric or may be washed out independently.

The viscosifiers which I have found suitable for the practice of my invention are polysaccharids containing or decomposable into a uronic acid.

I have found it most satisfactory to use white, odorless, tasteless powders derived from vegetable gums, and having the characteristics of carob-seed derivatives. Such gums are commonly known as caroban, locust-kernel gum, locust bean gum, carob-seed gum, carob-bean gum, gum Hevo, gum Gatto, gum Tragon, Jandagum, Lakoe gum, Lupogum, Luposol, Rubigum, Tragarab, Tragasol, Galagum, Emulsone, Kem, Koniaku, etc., and are generally prepared from the fruit of the carob tree (*ceritonia siliqua*) or *conaphallus konjah*. All of these gums may be identified primarily by the gelling action of borax on solutions thereof; and secondarily by the voluminous precipitate and gelling resulting from the addition of neutral lead acetate to solutions thereof and gelling resulting from the addition of basic lead acetate to such solutions; the negative action of iodine solution on solutions thereof; the stringy precipitate resulting from the addition of neutral ferric chloride to solutions thereof; and the precipitate resulting from the addition of tannic acid to solutions thereof. From a consideration of their ash, their ready conversion to a uronic acid, the nature of their hydrolysis products and oxidation to mucic acid, they have been found to contain small quantities of acid polysaccharids and probably belong to the class of polysaccharids known as hemicelluloses.

By the use of the foregoing substances in amounts down to as low as 1½% of the rubber solids in the case of vegetable gums having the characteristics of carob-seed derivatives, I am enabled to control the viscosity of latex for spreading, dipping, spraying and other purposes without substantially altering the desirable properties inherent in films or masses of unmodified latex, and to secure a degree of viscosity comparable to that resulting from the addition of about 67% of gum arabic or 125% of dextrine. The use of such small quantities of viscosifiers as required by my invention avoids the deterioration resulting from the use of large quantities of thickeners which decreases the tensile strength, ageing, elasticity and cohesion of the rubber, and leaves a porous and discontinuous film if washed out of the solidified film.

I have found that, in the practice of my invention, it is desirable, where a sol having low rubber concentration of high viscosity is desired, to dilute rubber latex, or a compound thereof, with an aqueous dispersion of the viscosifying material dispersed in sufficient water to render it readily miscible with latex and give simultaneously the required decrease in the concentration of rubber colloids and the desired viscosity. As an illustration of a preferred practice, there was slowly stirred into 286 grams of latex from *Hevea brasilliensis* (35% solids) 214 grams of 0.7% (seven-tenths percent) solution of carob seed derivative, so that there was added an amount of gum equal to about 1½% by weight of the rubber solids in the latex. The addition of this aqueous solution so diluted the sol as to decrease the rubber colloid from 35% to about 20%, by weight, in the compound, and the viscosity of the compound was increased from about 43 seconds on a Saybolt viscosimeter to about 280 seconds at 23° C. The aqueous solution containing the viscosifying agent preferably also contains a base, such as ammonia or alkali metal hydroxide, and may also contain vulcanizing, accelerating, and anti-oxidizing substances, or these materials may be added to the latex or to the final mixture.

The coating composition so produced was sufficiently viscous not to penetrate through the back to the face of a pile fabric to which it was applied, although the predyed backing in the pile fabric was so loosely woven as to be incapable alone of holding firmly the animal fibre pile tufts and hence unsuitable for its intended use without coating. The coatings are solidified and the rubber vulcanized preferably in an enclosed dryer at comparatively low temperatures. The pile was subsequently dyed with hot acid dye, which hydrolyzed and removed any free viscosifying material and left a thin film securely anchoring the pile.

If it is desired to form masses instead of films by the practice of my invention, a more concentrated solution of gum having the characteristics of carob-seed derivatives may be added to the latex and converted into a solid jelly by the addition of a saturated solution of borax or boric acid.

Having described my invention, I claim—

1. A liquid and uncreamed composition of matter comprising an aqueous acid free sol containing a gum and having an abnormal viscosity and a subnormal concentration of solidifiable rubber colloids as compared with normal natural latex, said gum being a product of the plant group ceritonia siliqua and conaphallus konjah and being uniformly and permanently dispersed among the rubber colloids.

2. A liquid and uncreamed composition of matter comprising an aqueous acid free sol containing an acid polysaccharid and rubber colloids in less concentration than normal natural latex and having a viscosity not less than the viscosity of normal natural latex, said acid polysaccharid being a product of the plant group ceritonia siliqua and conaphallus konjah and being uniformly and permanently dispersed among the rubber colloids.

3. In the art of manufacturing rubber products, the steps which consist in combining a sol containing solidifiable rubber colloids with a gum derived from seeds of the plant group ceritonia siliqua and conaphallus konjah, and adding borax or boric acid thereto.

4. A composition of matter comprising an aqueous dispersion of rubber colloids having a concentration of such colloids less than the minimum (say 30%) concentration of rubber colloids present in normal latex and a viscosifier consisting of an aqueous solution of the gum from the seeds of plants of the botanical group ceritonia siliqua and conaphallus konjah, said viscosifier being present in the proportion of not more than two parts dry weight of viscosifier to one hundred parts dry weight of rubber, and forming with the dispersed rubber a non-creaming composition having a viscosity at least several times the viscosity of the rubber dispersion alone when measured on a Saybolt viscosimeter.

GLEN S. HIERS.